(12) United States Patent
Watanabe et al.

(10) Patent No.: US 6,217,481 B1
(45) Date of Patent: Apr. 17, 2001

(54) SLIP CONTROL SYSTEM FOR TORQUE CONVERTER

(75) Inventors: Akira Watanabe, Kanagawa; Kazutaka Adachi, Yokohama, both of (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 09/433,381

(22) Filed: Nov. 3, 1999

(30) Foreign Application Priority Data

Nov. 6, 1998 (JP) .................................................. 10-315776

(51) Int. Cl.[7] .................................................. B60K 41/02
(52) U.S. Cl. ........................ 477/169; 477/64; 477/176; 192/3.31
(58) Field of Search .......................... 477/169, 62, 63, 477/64, 176; 192/3.28, 3.29, 3.3, 3.31

(56) References Cited

U.S. PATENT DOCUMENTS

| | | | |
|---|---|---|---|
| 5,722,912 | * | 3/1998 | Narita ...................................... 477/64 |
| 5,935,043 | * | 8/1999 | Watanabe et al. ..................... 477/169 |
| 6,039,675 | * | 3/2000 | Adachi et al. ........................ 477/174 |
| 6,050,919 | * | 4/2000 | Kusafuka et al. ..................... 477/176 |

FOREIGN PATENT DOCUMENTS 10-333703 * 12/1998 (JP) .

* cited by examiner

Primary Examiner—Sherry Estremsky
Assistant Examiner—Tisha D. Waddell
(74) Attorney, Agent, or Firm—McDermott, Will & Emery

(57) ABSTRACT

A slip control system for a torque converter with a lockup clutch comprises a controller that outputs a slip control signal to a slip control actuator of the lockup clutch to adjust an actual slip rotation speed of the torque converter at a target slip rotation speed. The controller is coupled to sensors for detecting information indicative of a condition of a drive system including the torque converter. The controller decides an operating state of the torque converter at time when the slip control is started, and selects one of initial valves for a slip command signal corresponding to the slip control signal according to the decided operating state of the torque converter at the start of the slip control. This arrangement functions to prevent troubles including shocks due to shortage of slippage in the torque converter and generation of radial slippage of the torque convert from generating at a time staring the slip control.

10 Claims, 13 Drawing Sheets

SLIP CONTROL SYSTEM FOR TORQUE CONVERTER

BACKGROUND OF THE INVENTION

The present invention relates to improvements in a slip control system which converges a slip rotation speed between input and output elements of a torque converter at a target value, and more particularly to a slip control system which suitably functions even during a transient period from the non slip-control range to a slip control range.

Generally, a torque converter has merits such as a torque fluctuation absorbing function and a torque multiplying function due to a fluid power transmission, although a transmission efficiency of the fluid power transmission is lower than that of a power transmission by a direct mechanical connection. In order to improve the transmission efficiency of the torque converter, most torque converters employ lockup clutches for directly connecting input and output elements of the torque converter when the vehicle is put in a running condition where the torque fluctuation absorbing function or the torque multiplying function are not required. Further, some of lockup torque converters have been proposed to execute a slip control of a lockup clutch. Such a slip control for a torque converter is generally arranged to determine a target slip rotation speed according to a vehicle running condition and to control an engagement force of the lockup clutch so as to adjust an actual slip rotation speed to the target slip rotation speed.

SUMMARY OF THE INVENTION

However, such a slip control system, which is arranged to estimate an output torque of the torque converter on the basis of a modeled torque converter and a modeled engine, is required to be further improved. More specifically, the slip control system is required to suitably operate even if the correspondence between the modeled objects and the controlled objects is degraded by errors in modeling, aging of the controlled objects, or deviation among controlled objects. Inventers of this invention have executed various simulations upon taking account of the degradation of this correspondence, and found that such degradation of the correspondence in some cases degrades the operational performance of the torque converter during a starting period of the slip control.

It is therefore an object of the present invention to provide an improved slip control system that solves the degradation of operational performance of a torque converter.

According to the present invention, a slip control system for a torque converter with a lockup clutch is arranged to control an actual slip rotation speed between input and output elements of the torque converter at a target slip rotation speed. The torque converter is connected to an engine and a transmission of a vehicle. The slip control system comprises a vehicle operation condition detector detecting operating condition of the vehicle, an actuator controlling a lockup clutch engagement pressure of the lockup clutch according to a control signal to adjust the actual slip rotation speed at the target slip rotation speed and a controller connected to the vehicle operating condition detector and the actuator. The controller is arranged to decide an operating state of the torque converter when the slip control is started, to decide an initial value of a slip rotation speed command value according to the operating state of the torque converter at the start of the slip control, to calculate the slip rotation speed command value on the basis of the detected vehicle operating condition, and to output the control signal corresponding to the slip rotation speed command value to the actuator.

DETAILED DESCRIPTION OF THE INVENTION

Referring to FIGS. 1 to 16E, there is shown an embodiment of a slip control system for a torque converter 2 in accordance with the present invention.

Figure 1:
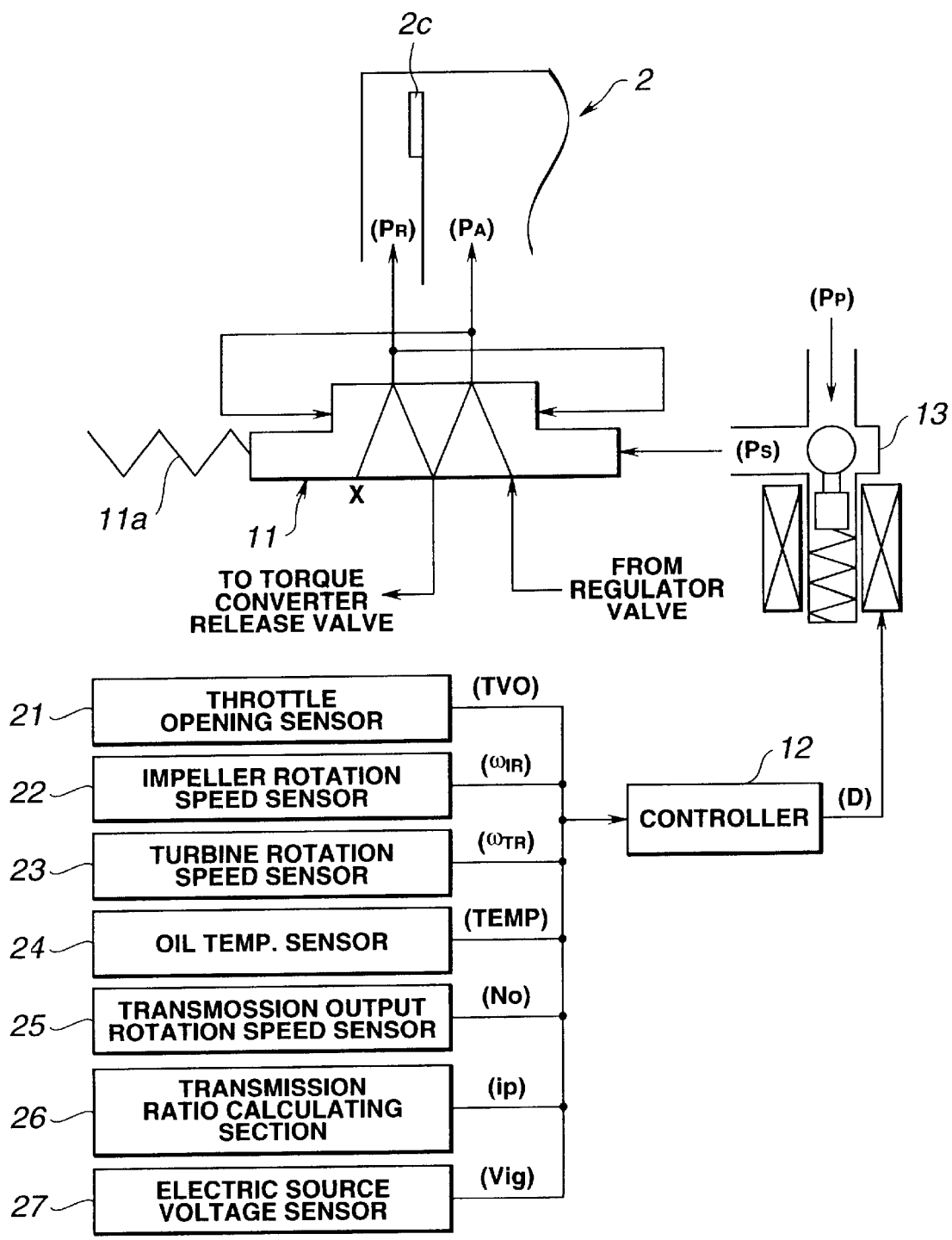
FIG. 1 is a schematic view of a slip control system of a torque converter of an embodiment according to the present invention.
Figure 2:
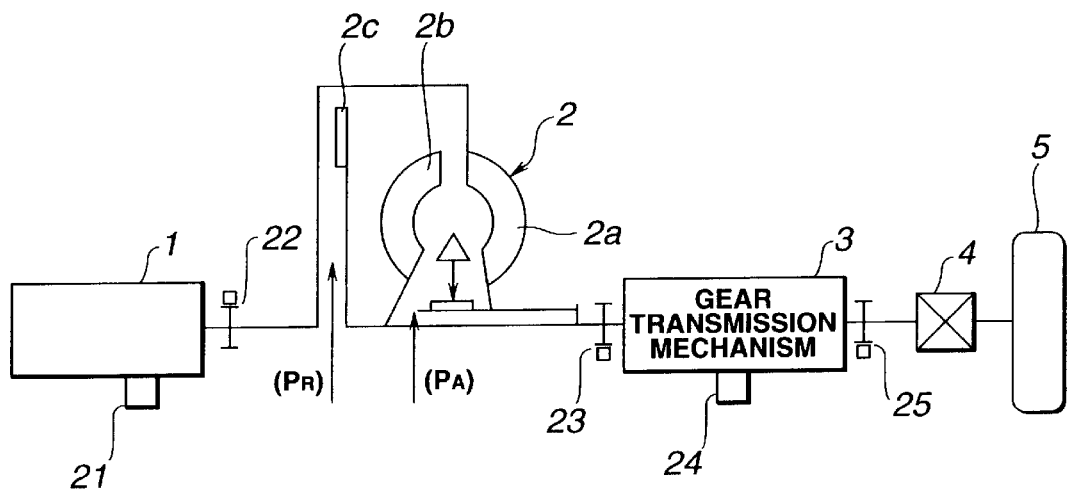
FIG. 2 is a schematic view of a drive system of a vehicle provided with the slip control system of FIG. 1.

FIG. 1 shows the slip control system of the torque converter 2 according to the embodiment of the present invention. The slip control system is employed in a drive system for a vehicle shown in FIG. 2. The drive system is constituted by an engine 1, the torque converter 2, a gear transmission mechanism 3 of an automatic transmission, a differential gear unit 4 and wheels 5 which are connected in order of mention.

The torque converter 2 is of a lockup type and comprises a pump impeller 2a functioning as an input element driven by the engine 1, a turbine runner 2b functioning as an output element connected to an input shaft of the gear transmission mechanism 3, and a lockup clutch 2c directly connecting the pump impeller 2a and the turbine runner 2b.

An engagement force of the lockup clutch 2c is determined by a difference (lockup clutch engagement pressure) between an apply pressure $P_A$ and a release pressure $P_R$. When the apply pressure $P_A$ is smaller than the release pressure $P_R$, the lockup clutch 2c is put in a released condition so as not to directly connect the pump impeller 2a and the turbine runner 2b. That is, under this pressure balance, the torque converter 2 is put in a converter state where the slip between the pump impeller 2a and the turbine runner 2b is not limited.

When the apply pressure $P_A$ is greater than the release pressure $P_R$ and when the difference therebetween is smaller than a predetermined value, the lockup clutch 2c is slippingly engaged according to the difference such that the torque converter 2 is operated in a slip control state where the slip speed of the torque converter 2 is controlled according to the engagement force of the lockup clutch 2b. Further, when the apply pressure $P_A$ is greater than the release pressure $P_R$ and when the difference becomes greater than the predetermined value, the torque converter 2 is put in a lockup state where a relative rotation between the pump impeller 2a and the turbine runner 2b becomes zero.

A slip control valve 11 is arranged to determine the apply pressure $P_A$ and the release pressure $P_R$ according to a signal pressure $P_S$ from a lockup solenoid 13 duty-controlled by a controller 12. The ship control valve 11 and the lockup solenoid 13 are of conventional types, respectively. That is, the lockup solenoid 13 is arranged to increase the signal pressure $P_S$ according to increase the solenoid drive duty D applied from the controller 12 to employ a pilot pressure $P_P$ as a base pressure.

Figure 3:
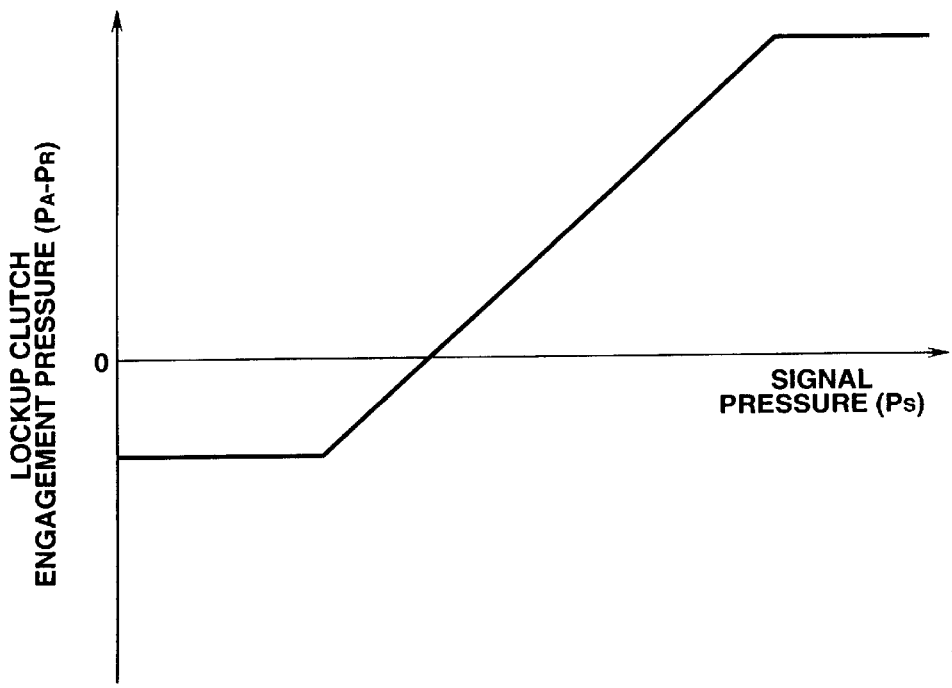
FIG. 3 is a graph showing a relationship between a signal pressure outputted from a lockup solenoid and a lockup clutch engagement pressure.

The slip control valve 11 receives the signal pressure $P_S$ and the feedback release pressure $P_R$ in the same direction and receives a spring force of a spring 11a and the feedback apply pressure $P_A$ in an opposite direction opposite to the direction of the signal pressure $P_S$, as shown FIG. 1. The lockup clutch engagement pressure represented by a difference ($P_A-P_R$) between the apply pressure $P_A$ and the release pressure $P_R$ is changed according to the change of the signal pressure $P_S$ as shown in FIG. 3.

When the lockup clutch engagement pressure ($P_A-P_R$) takes a negative value, that is, when $P_R>P_A$, the torque converter 2 is put in a converter state. When the lockup clutch engagement pressure ($P_A-P_R$) takes a positive value, that is, when $P_A<P_R$, the engagement capacity of the lockup clutch 2c is increased according to the increase of the positive value ($P_A-P_R$) so as to increase the limiting of the slip rotation of the torque converter 2. Then, when the lockup clutch engagement pressure becomes greater than a predetermined value, the torque converter 2 is put in the lockup state.

As shown in FIG. 1, the controller 12 receives a plurality of signals, such as a signal TV0 from a throttle opening sensor 21 for detecting a throttle opening TV0 of the engine 1, a signal $\omega_{IR}$ from an impeller rotation speed sensor 22 for detecting a rotation speed $\omega_{IR}$ of the pump impeller 2a, a signal $\omega_{TR}$ from a turbine rotation speed sensor 23 for detecting a rotation speed $\omega_{TR}$ of the turbine runner 2b, a signal TEMP from an oil temperature sensor 24 for detecting a working oil temperature TEMP of an automatic transmission, a signal $N_0$ representative of a transmission output rotation speed corresponding to a vehicle speed from a transmission output rotation speed sensor 25, a transmission ratio indicative signal $i_P$ from a transmission ration calculating section 26, and a signal $V_{ig}$ from an electric source voltage sensor 27.

The controller 12 determines a drive duty ratio D of the lockup solenoid 13 by executing the calculations on the basis of the above-mentioned signals. More specifically, the controller 12 executes the slip control according to the present invention by executing the calculations according to functional block diagrams shown in FIGS. 4 to 6 and 7A.

Figure 4:
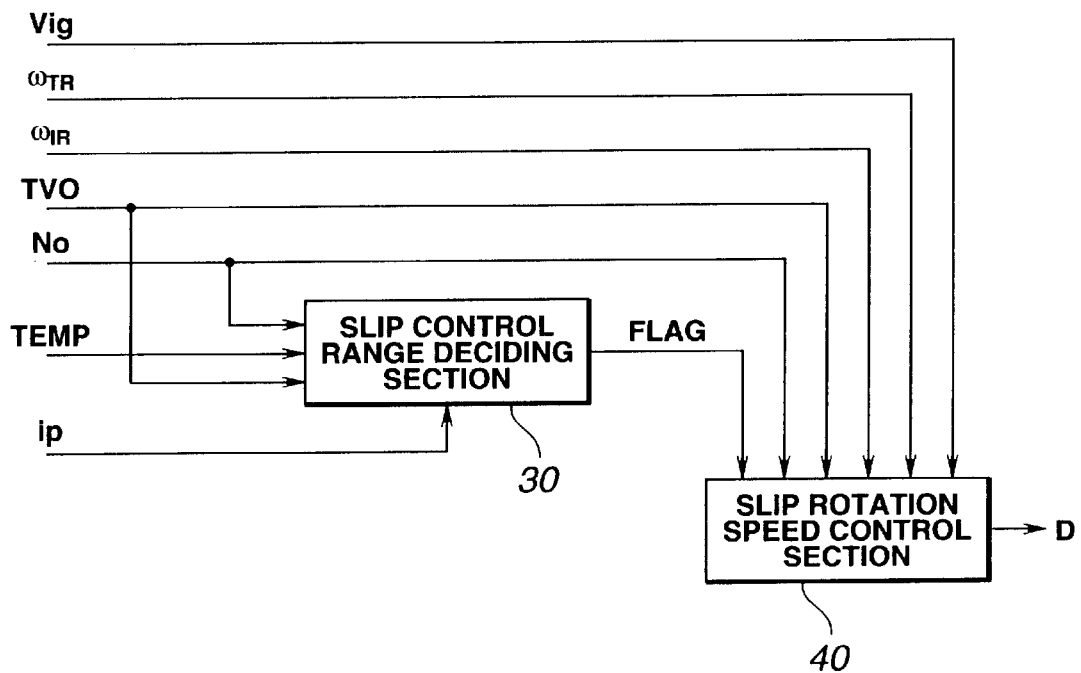
FIG. 4 is a block diagram showing the slip control executed by a controller of the slip control system according to the present invention.

As shown in FIG. 4, the slip control range determining section 30 receives the throttle opening TV0, the transmission output speed $N_0$ and the fluid temperature TEMP and the transmission ratio $i_p$. The slip control range determining section 30 of the controller 12 decides whether the torque converter 2 is operated in a drive slip control (S/L) range, a converter (C/V) range or a lockup (L/U) range, by executing a range deciding program shown in FIG. 8. When the torque converter 2 is operating in the drive slip control range, the torque converter 2 is controlled so that the slip rotation speed of the torque converter 2 is adjusted at a target slip rotation speed. When the torque converter 2 is operating in the converter range, the slippage between the pump impeller 2a and the turbine runner 2b is not restricted. When the torque converter 2 is operating in the lockup range, no slippage between the pump impeller 2a and the turbine runner 2b is generated.

The range deciding operation for deciding the operating range of the torque converter 2 will be explained with reference to the flowchart of FIG. 8, hereinafter.

Figure 8:
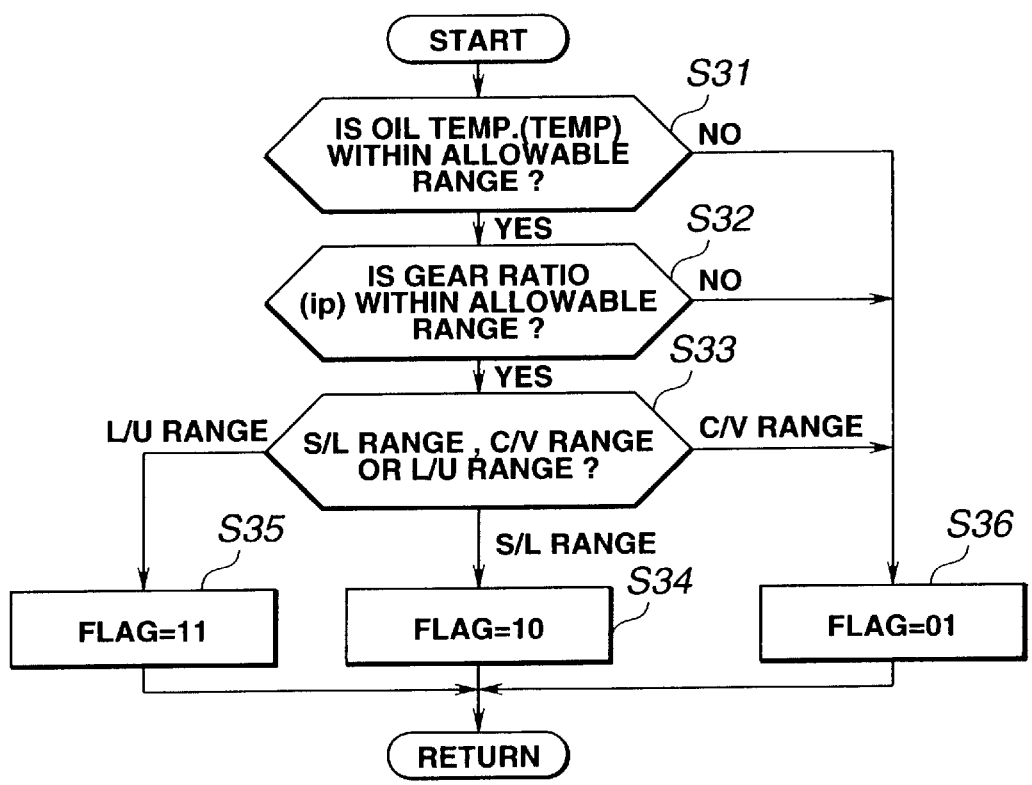
FIG. 8 is a flowchart showing a program for deciding a transmission operating range deciding program executed at a slip control range deciding section of a controller of FIG. 4.

At a step S31 of FIG. 8, the controller 12 decides whether the hydraulic oil temperature TEMP is within an allowable range in which the slip limiting operation can be executed and which corresponds to a condition after warming up of the engine 1. When the decision at the step S31 is negative, the routine proceeds to a step S36 wherein a slip control flag FLAG is set at 01 (FLAG=01). When the decision at the step S31 is affirmative, the routine proceeds to a step S32.

At the step S32, the controller 12 decides whether the transmission ratio $i_p$ is within an allowable range in which the slip limiting can be executed. When the decision at the step S32 is negative, the routine proceeds to the step S36. When the decision at the step S32 is affirmative, the routine proceeds to a step S33.

Figure 10:
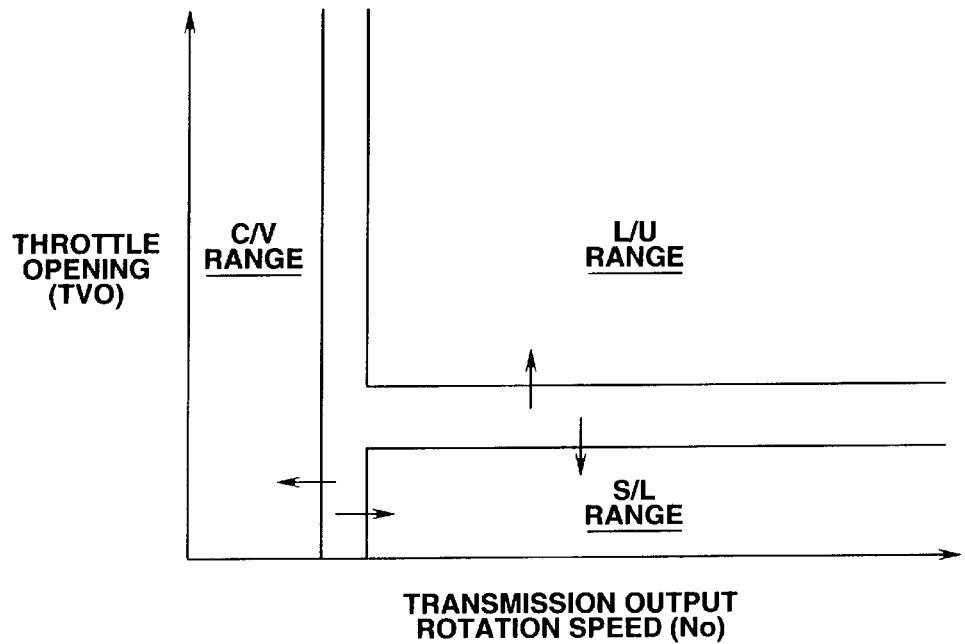
FIG. 10 is a graph showing boundaries among a converter range, a slip control range and a lockup range of the torque converter.
Figure 11:
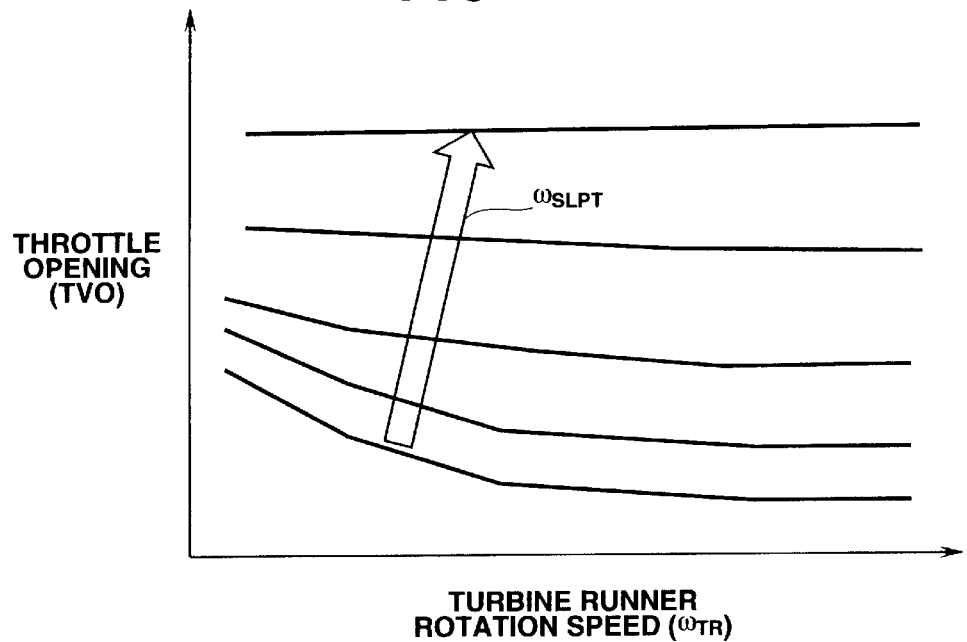
FIG. 11 is a graph showing a predetermined map of a target slip rotation speed with respect to a turbine runner rotation speed and a throttle opening.

At the step S33, the controller 12 decides whether the torque converter 3 is operated in the drive slip control range, the converter range or the lockup range, on the basis of a first map corresponding to the graph shown in FIG. 10, the transmission output rotation speed No and the throttle opening TV0. The first map has been previously stored in a data storage section of the controller 12 so that the controller 12 can quickly check the state of the torque converter 3. In FIG. 10, the converter (C/V) range corresponds to a slip unlimited state where the lockup clutch 2c is released so that the torque converter 2 is operated in the converter range in that the slip rotation speed between the input and output elements are not limited. The drive slip control (S/L) range corresponds to a slip control range where the lockup clutch 2c is set at a sliding state so that the slip rotation speed between the input and output elements 2a and 2b of the torque converter 2 is adjusted at a target speed to maintain a slip control state. The lockup (L/U) range corresponds to a non slipping state where the lockup clutch 2c is fully engaged so as to maintain the slip rotation speed between the input and output elements 2a and 2b at zero.

A dead zone is provided at a boundary among the drive slip control range, the converter range and the lockup range, as shown in FIG. 10. The dead zone functions to absorb the hysteresis of the operation of the torque converter 2. That is, the provision of this dead zone functions to prevent hunting as to the decision of the operation range of the torque converter 2 from being generated.

When the controller 12 decides at the step S33 that the torque converter 2 is operating in the driver slip control (S/L) range, the routine proceeds to a step S34 wherein the slip control flag FLAG is set at 10 (FLAG=10).

When the controller 12 decides at the step S33 that the torque converter 2 is operating in the lockup (L/U) range, the routine proceeds to a step S35 wherein the slip control flag FLAG is set at 11 (FLAG=11).

When the controller 12 decides at the step S33 that the torque converter 2 is operating in the converter (C/V) range, the routine proceeds to the step S36 wherein the slip control flag FLAG is set at 01 (FLAG=01).

The slip control flag FLAG determined in the range decision program of FIG. 8 is supplied to a slip rotation speed controlling section 40 shown in FIG. 4. The slip rotation speed controlling section 40 is provided in the controller 12 in the form of a program.

Figure 5:
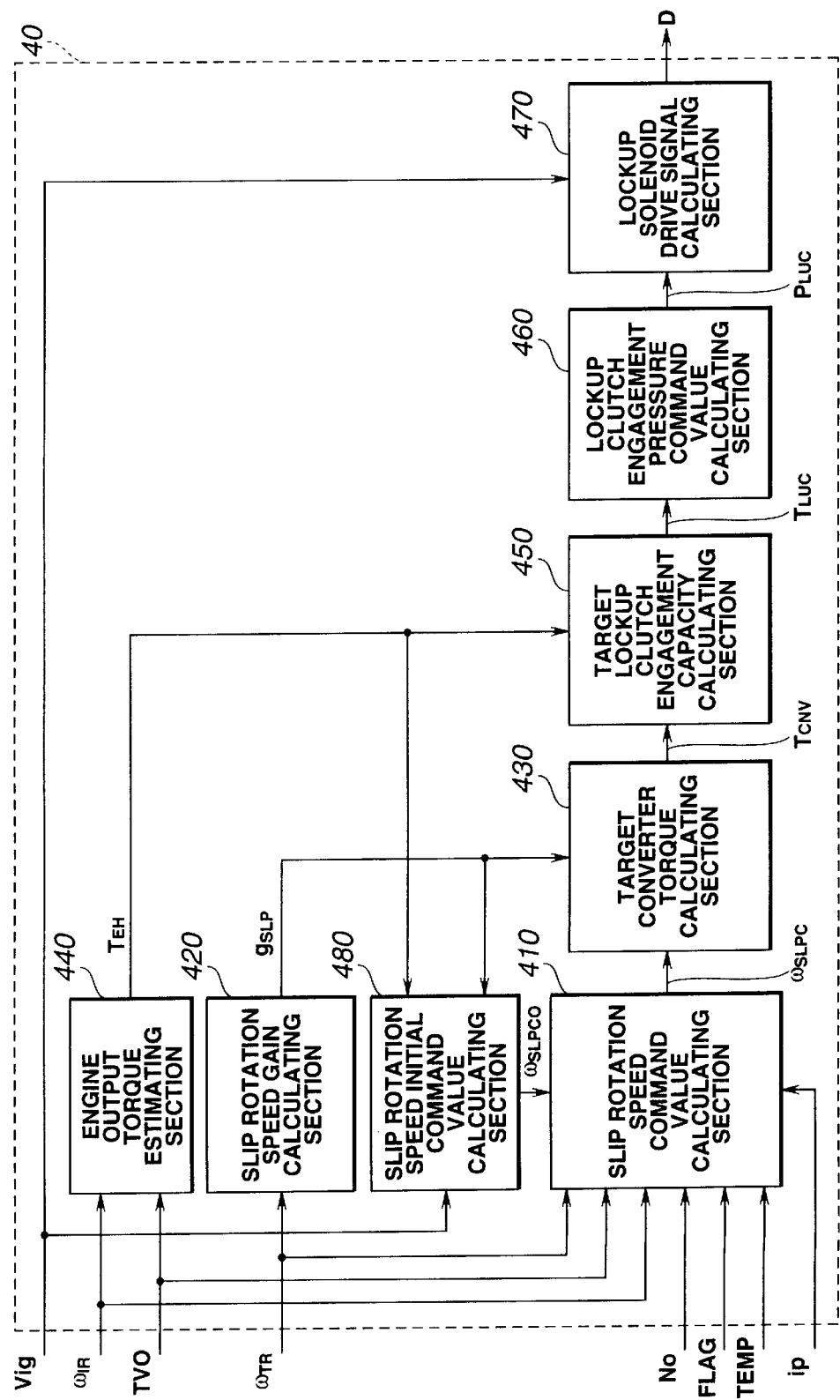
FIG. 5 is a detailed block diagram of a slip rotation speed control section of FIG. 4.

The slip rotation speed controlling section 40 is constituted by a slip rotation speed command value calculating section 410, a slip rotation speed gain calculating section 420, a target converter torque calculating section 430, an engine output torque estimating section 440, a target lockup clutch engagement capacity calculating section 450, a lockup clutch engagement pressure command value calculating section 460, a solenoid drive signal calculating section 470 and a slip rotation speed initial command value calculating section 480, as shown in FIG. 5. A drive duty D for operating the lockup solenoid 13 is determined by the calculations executed in the slip rotation speed controlling section 40 and is employed in the slip control.

Figure 6:
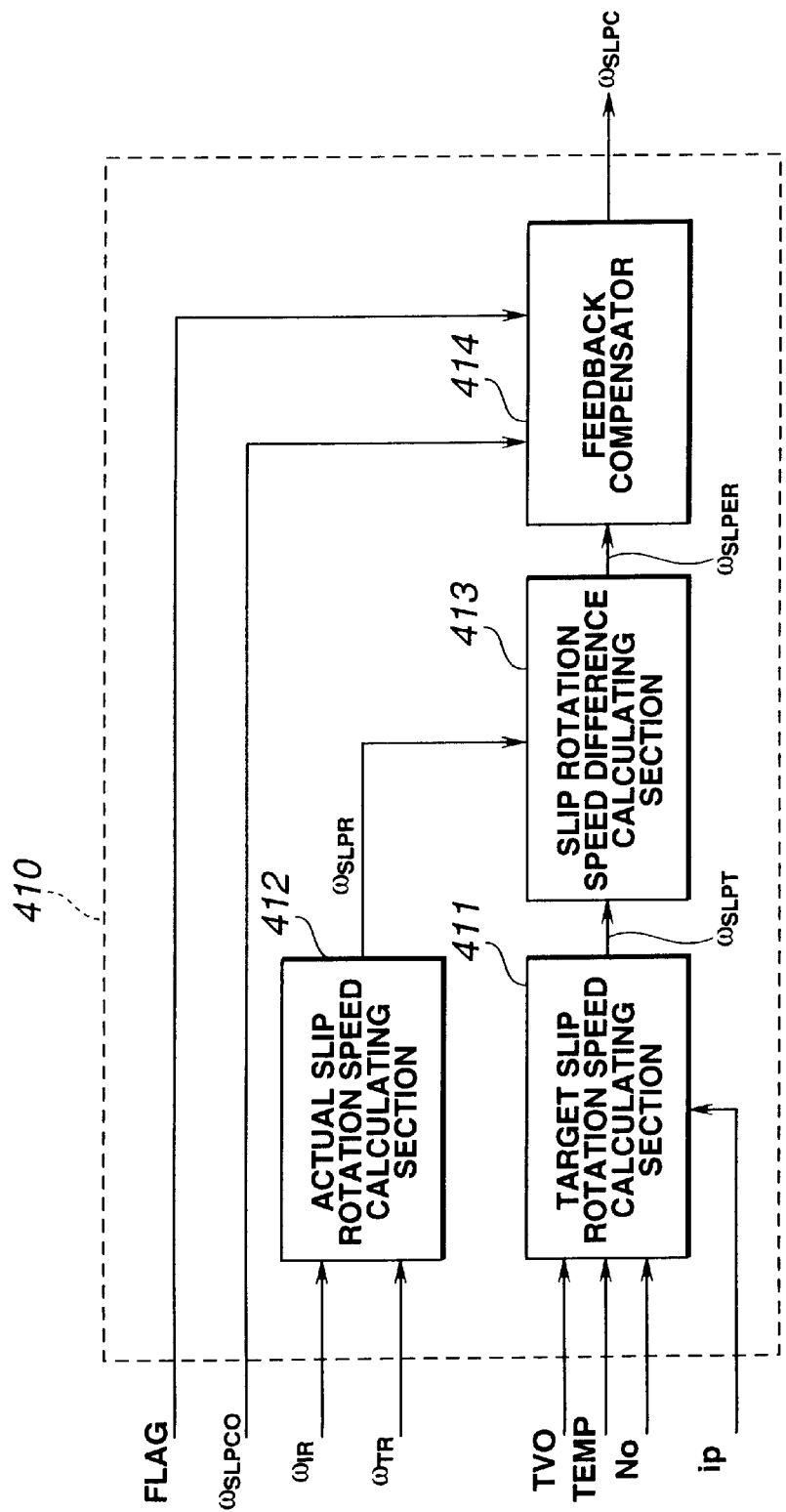
FIG. 6 is a further detailed block diagram showing a slip rotation speed command value calculating section of FIG. 5.

The slip rotation speed command value calculating section 410 is arranged as shown in FIG. 6. That is, a target slip rotation speed calculating section 411 shown in FIG. 6 is arranged to calculate a target slip rotation speed $\omega_{SLPT}$ on the basis of a second map corresponding to a graph shown in FIG. 11 and from the transmission ratio $i_p$, the hydraulic oil temperature TEMP, a turbine runner rotation speed $\omega_{TR}$, and the throttle opening TV0. The second map has been obtained by each transmission ratio $i_p$ and the hydraulic oil temperature TEMP and has been stored in the controller 12. The target slip rotation speed $\omega_{SLPT}$ is a smallest value within a range where torque deviation from the torque converter 2 and noises in a passenger compartment are suppressed. Accordingly, for the purpose of preventing the torque deviation and the noises in the passenger compartment, the target slip rotation speed $\omega_{SLPT}$ takes a larger value according to the decrease of the turbine runner rotation speed $\omega_{TR}$. Further, when the throttle opening TV0 representative of an engine load is large, that is, when the vehicle requires large driving force, the input torque during this period should be sufficiently supplied from the torque converter 2 to a transmission mechanism 3 so as not to generate a shortage of the input torque during the slip control. Therefore, the target slip rotation speed $\omega_{SLPT}$ is set a larger value which is increased according to the increase of the throttle opening TV0.

The actual slip rotation speed calculating section 412 shown in FIG. 6 is arranged to calculate an actual slip rotation speed $\omega_{SLPR}$ by subtracting the turbine runner rotation speed $\omega_{TR}$ from a pump impeller rotation speed $\omega_{IR}$ ($\omega_{SLPR}=\omega_{IR}-\omega_{TR}$).

The slip rotation speed difference calculating section 413 is arranged to calculate a slip rotation speed difference between the target slip rotation speed $\omega_{SLPT}$ and the actual slip rotation speed $\omega_{SLPR}$ from the following equation (1):

$$\omega_{SLPER}=\omega_{SLPT}-\omega_{SLPR} \tag{1}$$

Further, the feedback compensator 414 of FIG. 6 is arranged to calculate a slip rotation speed command value $\omega_{SLPC}$ at time t on the basis of a transfer function $G_{CNT}(s)$. More specifically, the slip rotation speed command value $\omega_{SLPC}$ at time t is employed for adjusting the actual slip rotation speed $\omega_{SLPR}$ at the target slip rotation speed $\omega_{SLPT}$ by canceling the slip rotation speed difference $\omega_{SLPER}$ and is calculated from the following equation (2):

$$\omega_{SLPC}(t)=G_{CNT}(S)\cdot\omega_{SLPER}(t). \tag{2}$$

The feedback compensator 414 especially sets the slip rotation speed command value $\omega_{SLPC}$ at an initial value $\omega_{SLPC0}$ ($\omega_{SLPC}\leftarrow_{SLPC0}$) when the controller 12 decides from the slip control flag FLAG that the slip control has been just started. The detailed function of the feedback compensator 414 will be understood from the explanation of the slip rotation speed control section 40 with reference to FIGS. 5 and 9.

Figure 12:
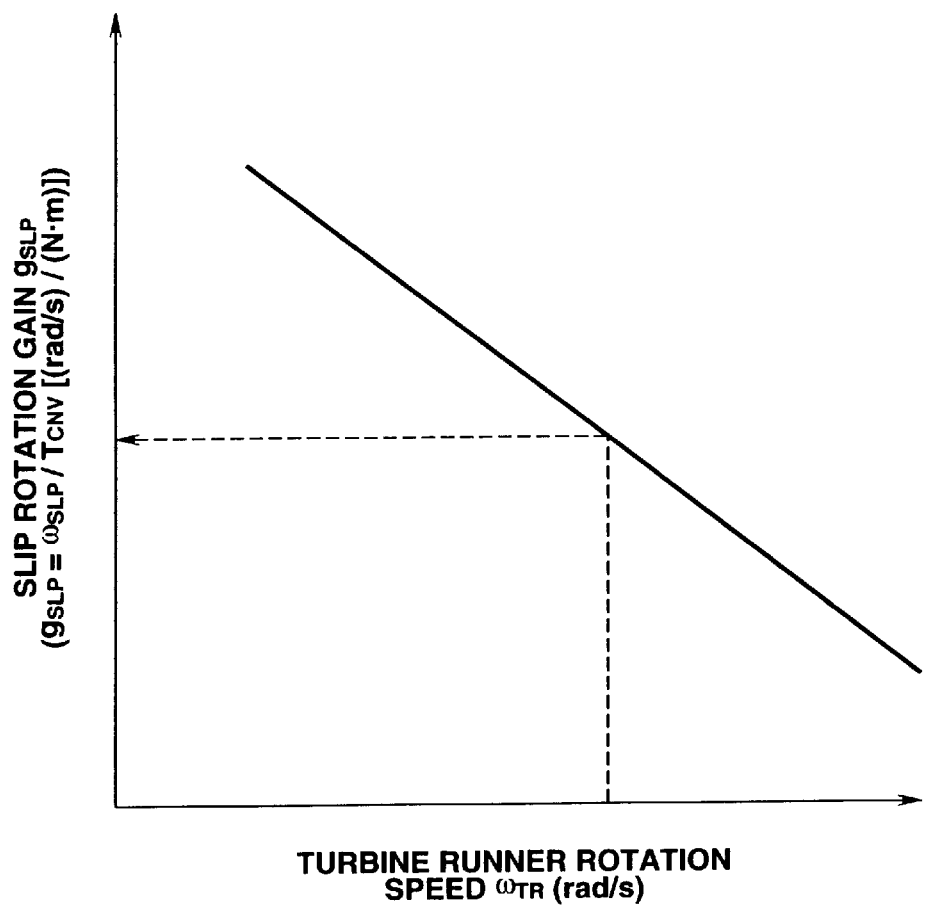
FIG. 12 is a graph showing a relationship between a turbine rotation speed and a slip rotation speed gain of a torque converter.

The slip rotation speed gain calculating section 420 of FIG. 5 retrieves a slip rotation speed gain $g_{SLP}$ from a map corresponding to a graph of FIG. 12 on the basis of the turbine runner rotation speed $\omega_{TR}$. The slip rotation speed gain $g_{SLP}$ is defined as a ratio of the slip rotation speed $\omega_{SLP}$ with respect to a converter torque $T_{CNV}$ and is expressed as follows:

$$g_{SLP}=\omega_{SLP}/T_{CNV} \tag{3}$$

The converter torque $T_{CNV}$ is a transfer torque transferred by means of the fluid transfer of the torque converter 2. A relationship among the converter torque $T_{CNV}$, the slip rotation speed $\omega_{SLP}$ and the turbine runner rotation speed $\omega_{TR}$ can be previously obtained from the transfer characteristic of the torque converter 2. Further, the slip rotation speed gain $g_{SLP}$ decreases according to the increase of the turbine runner rotation speed $\omega_{TR}$ as shown by a continuous line in the graph of FIG. 12. Therefore, it is possible to retrieve the slip rotation speed gain $g_{SLP}$ from the above-mentioned relationships and the turbine runner rotation speed $\omega_{TR}$.

The target converter torque calculating section 430 receives the retrieved slip rotation speed gain $g_{SLP}$ and calculates the converter torque $T_{CNV}$ necessary for achieving the slip rotation speed command $\omega_{SLPC}$ under the turbine rotation runner rotation speed $\omega_{TR}$. Mere specifically, the converter torque $T_{CNV}$ is obtained by executing the calculation of the following equation (4):

$$T_{CNV}(t)=\omega_{SLPC}(t)/g_{SLP} \tag{4}$$

Figure 13:
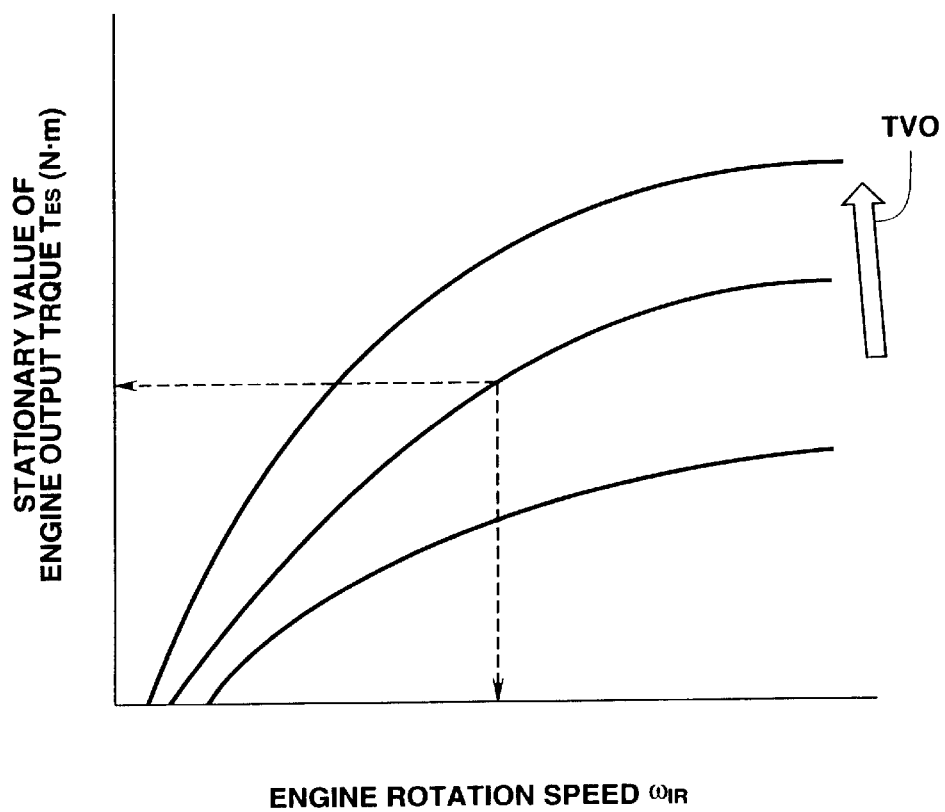
FIG. 13 is a graph showing a relationship among a throttle opening, a rotation speed and an output torque of an engine coupled to the torque converter.

The engine output torque estimating section 440 retrieves a stationary value $\omega_{IR}$ from an engine performance map corresponding to a graph shown in FIG. 13 and from the pump impeller rotation speed $\omega_{IR}$ corresponding to the engine rotation speed and the throttle opening TV0. Further, the engine output torque estimating section 440 executes a filter treatment by treating the obtained stationary value $T_{ES}$ at a filter which has a value corresponding to an engine dynamic delay of the engine 1 to obtain an engine torque $T_{EH}$ which is further close to an actual value. Practically, the further actual engine output torque $T_{EH}$ is obtained from the following equation (5):

$$T_{EH}(t)=[1/(t_{ED} \cdot S=1)]T_{ES}(t) \tag{5}$$

The target lockup clutch engagement capacity calculating section 450 calculates a target lockup engagement capacity $T_{LUC}$ by subtracting the target converter torque $T_{CNV}$ from the filtered engine output torque $T_{EH}$, practically by executing the calculation of the following equation (6):

$$t_{LUC}(t)=T_{EH}(t)-T_{CNV}(t) \tag{6}$$

Figure 14:
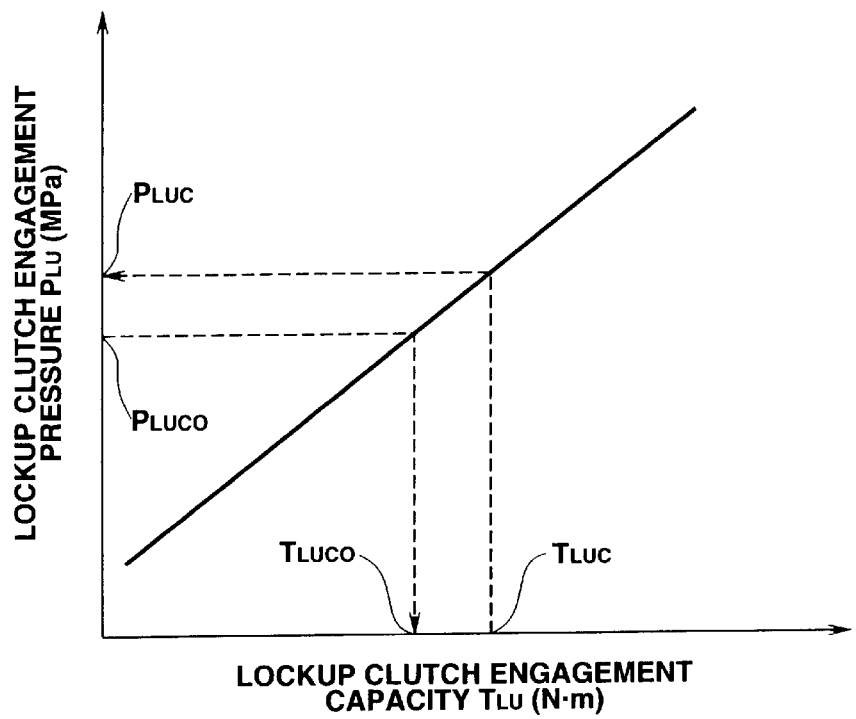
FIG. 14 is a graph showing a relationship between the engagement pressure and an engagement capacity of the lockup clutch.

The lockup clutch engagement pressure command value calculating section 460 retrieves a lockup clutch engagement pressure command value $P_{LUC}$ for achieving the target lockup clutch engagement $T_{LUC}$ from a map corresponding to a graph shown in FIG. 14. A relationship shown FIG. 14 is prepared by each torque converter and has been previously obtained by means of experiments. Therefore, the target lockup clutch engagement capacity $T_{LUC}$ can be obtained from the map corresponding to the graph of FIG. 14 by each torque converter and the lockup clutch engagement pressure command $P_{LUC}$.

Figure 15:
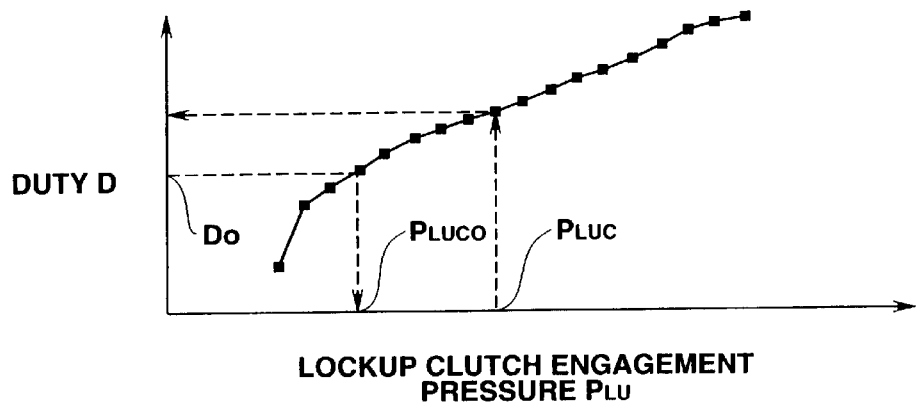
FIG. 15 is a graph showing a relationship between the lockup clutch engagement pressure and a lockup solenoid drive duty.

The solenoid drive signal calculating section 470 determines a lockup solenoid drive duty D for adjusting the actual lockup clutch engagement pressure $P_{LU}$ at the target lockup clutch engagement pressure $P_{LUT}$ on the basis of a map which has been prepared for each source voltage $V_{ig}$ as shown in FIG. 15. The solenoid drive signal calculating section 470 outputs the determined lockup solenoid drive duty D to the lockup solenoid 13. This enables the slip control system according to the present invention to adjust the actual slip rotation speed $\omega_{SLPR}$ at the slip rotation speed command value $\omega_{SLPC}$ during the transient period of the slip control and to adjust the actual slip rotation speed $\omega_{SLPR}$ at the target slip rotation speed $\omega_{SLPT}$ during the stationary period of the slip control.

Figure 7A:
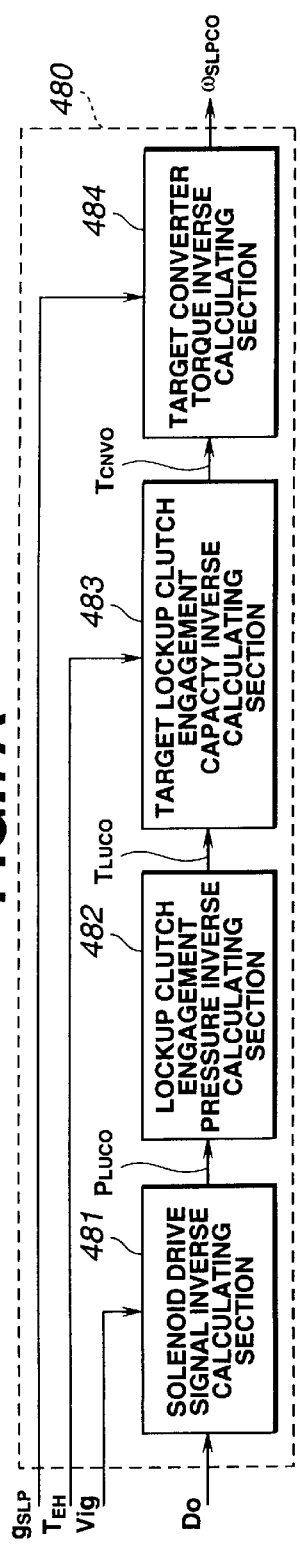
FIG. 7A is a detailed block diagram of a slip rotation speed initial command value calculating section of FIG. 5.

The slip rotation speed initial command value calculating section 480 employed in the first embodiment is particularly arranged as shown in FIG. 7A. Before explaining the construction of slip rotation speed initial command value calculating section 480, the processing executed by the feedback compensator 414 shown in FIG. 6 will be discussed.

When the feedback compensator 414 obtains the slip command value and when the equation (2) for obtaining the slip rotation speed command value $\omega_{SLPC}$ is employed in the control system, it is possible to employ the following state equations (7), (8) and (9):

$$(d/dt)x(t)=A_{CNT}x(t)+B_{CNT}\omega_{SLPER}(t) \tag{7}$$

$$\omega_{SLPC}(0)=\omega_{SLPC0} \tag{8}$$

$$\omega_{SLPC}(t)=C_{CNT}x(t)+D_{CNT}\omega_{SLPER}(t) \tag{9}$$

where x(t) is an n-dimension state vector, A is an n×n dimension matrix, B is an n×1-matrix, C is a 1×n-matrix and D is a 1×1-matrix.

The equation (8) represents an equation for setting an initial value $\omega_{SLPC0}$ of the slip rotation speed command value $\omega_{SLPC}$. When the slip control is started from the converter state or the lockup state, an initialization of the lockup command value $\omega_{SLPC}$ is executed by the following manner.

The slip rotation speed initial command value calculating section 480 determines the initial value $\omega_{SLPC0}$ by initializing the slip rotation speed command value $\omega_{SLPC0}$, and outputs the initial value $\omega_{SLPC0}$ to the slip rotation speed command value calculating section 410 of FIG. 5, and more particularly to the feedback compensator 414 of FIG. 6.

As shown in FIG. 7A, the slip rotation speed initial command value calculating section 480 is constituted by a solenoid drive signal inverse calculating section 481, a lockup clutch engagement pressure command value inverse calculating section 482, a target lockup clutch engagement capacity inverse calculating section 483 and a target converter torque inverse calculating section 484. Each of these calculating sections 481 to 484 is an inverse system of each of the calculating sections 430, 450, 460 and 470 shown in FIG. 5.

The solenoid drive signal inverse calculating section 481 receives the initial value $D_0$ of the lockup solenoid drive duty and the source voltage $V_{ig}$, and executes an inverse calculation of the lockup solenoid diver signal calculating section 470 of FIG. 5. That is, the solenoid drive signal inverse calculating section 481 inversely retrieves the lockup clutch engagement pressure initial command value $P_{LUC0}$ from the map prepared by each source voltage $V_{ig}$ as shown in FIG. 15 and the solenoid drive duty initial value $D_0$. When the slip control is started from the converter state, the lockup solenoid drive duty initial value $D_0$ is set at a value by which the actual slip rotation speed $\omega_{SLPR}$ is compensated so as to be greater than the allowable lower limit of the slip rotation speed where the engagement shock of the lockup clutch 2c is negligible. On the other hand, when the slip control is started from the lockup state, the lockup solenoid drive duty initial value $D_0$ is set such that the actual slip $\omega_{SLPR}$ is maintained at zero.

The lockup clutch engagement pressure command value inverse calculating section 482 receives the lockup clutch engagement initial command value $P_{SLP0}$ and executes an inverse calculation of the lockup clutch engagement pressure command value calculating section 460 of FIG. 5. That is, the lockup clutch engagement pressure command value inverse calculating section 482 inversely retrieves the target lockup clutch engagement capacity initial command value $T_{LUC0}$ from a map corresponding to the graph shown in FIG. 14 and the lockup clutch engagement pressure initial command value $_{TLUC0}$.

The target lockup clutch engagement capacity inverse calculating section 483 receives the target lockup clutch engagement capacity initial value $T_{LUC0}$ and the engine output torque estimate $T_{EH}$ and executes an inverse calculation of the calculation executed at the target lockup clutch engagement capacity calculating section 450 of FIG. 5. That is, the target lockup clutch engagement capacity inverse calculating section 483 calculates the target converter torque initial value $T_{CNV0}$ from the following equation (10) based on the equation (6):

$$T_{CNV0}(t)=T_{EH}(t)-T_{LUC0} \tag{10}$$

The target converter torque inverse calculating section 484 receives the target converter torque initial value $T_{CNV0}$ and the slip rotation speed gain $g_{SLP}$ and executes an inverse calculation of the target converter torque calculating section 430 of FIG. 5. More specifically, the target lockup clutch engagement capacity inverse calculating section 484 calculates the slip rotation speed initial command value $\omega_{SLPC0}$ from the following equation (11) based on the equation (4):

$$\omega_{SLPC0}(t)=g_{SLP}(t) \cdot T_{CNV0} \tag{11}$$

The lockup solenoid drive duty initial value $D_0$ has been set to have two values one of which is set so that the actual slip rotation speed $\omega_{SLPR}$ is adjusted to the allowable lower limit of the slip rotation speed when the slip control is executed from the converter state, and the other of which is set such that the actual slip $\omega_{SLPR}$ is maintained at zero when the slip control is started from the lockup state. Therefore, the slip rotation speed initial command value $\omega_{SLPC0}$ obtained on the basis of the lockup solenoid drive duty initial value $D_0$ also has two values. Hereinafter, $\omega_{SLPC0}$(C/V) represents the slip rotation speed initial command value $\omega_{SLPC0}$ based on the duty initial value $D_0$ obtained when the slip control is started from the converter state, and $\omega_{SLPC0}$ (L/U) represents the slip rotation speed initial command value $\omega_{SLPC0}$ based on the duty initial value $D_0$ obtained when the slip control is started from the lockup state.

Figure 9:
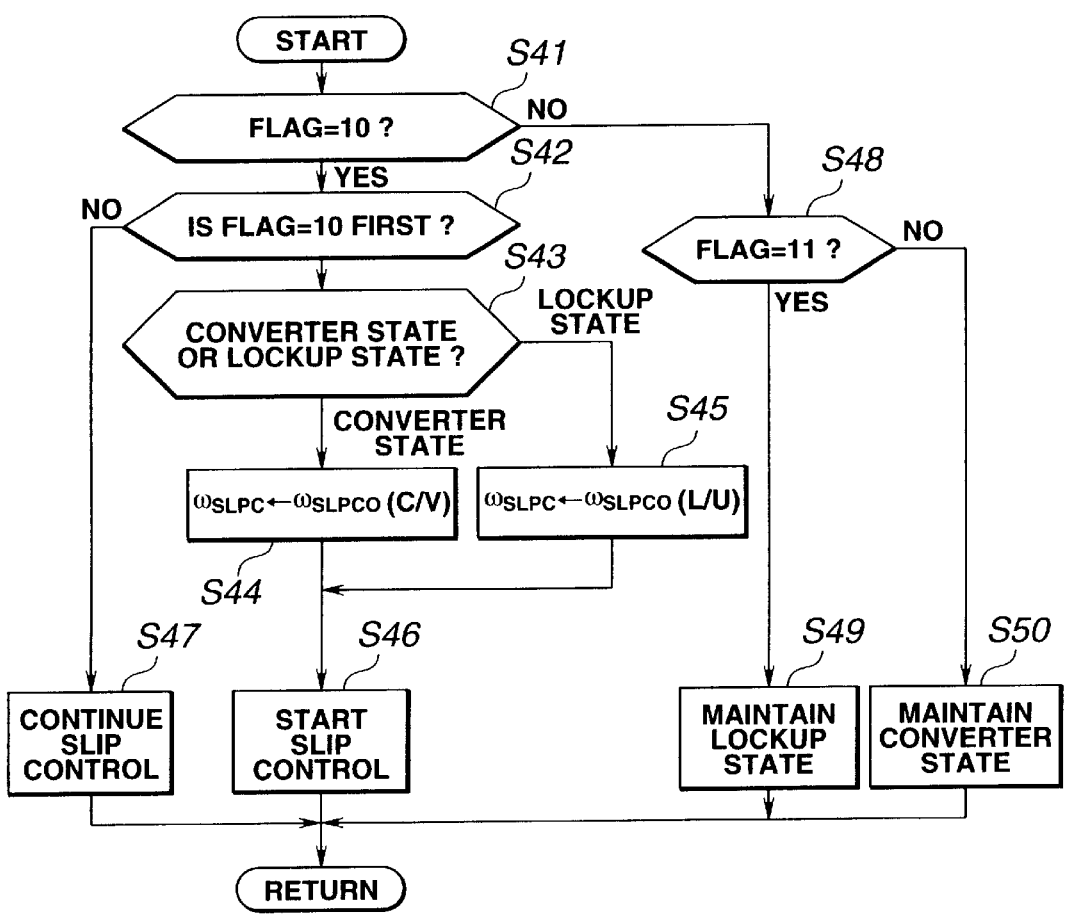
FIG. 9 is a flowchart showing a slip control program executed at the slip rotation speed control section of the controller of FIG. 4.

The operation for determining the lockup solenoid drive duty D during the slip control executed by the slip rotation speed control section 40 of FIG. 5 will be discussed with reference to the program shown in FIG. 9.

At a step S41, the controller 12 decides whether the slip control flag FLAG is 10 or not, that is, whether the torque converter 2 is operated in the slip control (S/L) range or not. When the decision at the step S41 is affirmative, that is, when the torque converter 2 is operated in the slip control range (FLAG=10), the routine proceeds to a step S42. When the decision at the step S41 is negative (FLAG≠10), the routing proceeds to a step S48.

At the step S42, the controller decides whether FLAG=10 is first time or not, more specifically, whether or not the slip control has been just started from a non slip-control state including the converter state and the lockup state. When the decision at the step S42 is affirmative, the routine proceeds to a step S43. When the decision at the step S42 is negative, the routine proceeds to a step S47.

At the step S43, the controller 12 decides whether the torque converter 2 is operating under the converter state or the lockup state. That is, the step S43 is executed to check whether the slip control is started from the converter state or the lockup state. When the controller 12 decides that the slip control is started from the converter state, the routine proceeds to a step S44 wherein the initial value $\omega_{SLPC0}$(C/V) for the converter state is employed as the initial value $\omega_{SLPC0}$ ($\omega_{SLPC0}$77 $\omega_{SLPC0}$(C/V)). When the controller 12 decides that the slip control is started from the lockup state, the routine proceeds to a step S45 wherein the initial value $\omega_{SLPC0}$(L/U) for the lockup state is employed as the initial value $\omega_{SLPC0}$ ($\omega_{SLPC0} \leftarrow \omega_{SLPC0}$(L/U)).

At a step 46 following to the step S44 or S45, the controller 12 starts the slip control upon employing the initial value $\omega_{SLPC0}$ decided by the above processing. More specifically, the target converter torque calculating section 430 receives the slip rotation speed command value $\omega_{SLPC}$ which has been initialized, and the lockup solenoid drive duty D is then determined by sequentially executing the calculations of the calculating sections 450, 460 and 470. The slip control is started by this operation.

At the step S47 following to the negative decision of the step S42, the controller 12 executes an operation for continuing the slip control for adjusting the actual slip rotation speed $\omega_{SLPR}$ to the target slip rotation speed $\omega_{SLPT}$ by a predetermined response. Practically, this continuation of the slip control is executed by inputting the slip rotation speed command value $\omega_{SLPC}$, which corresponds to the slip rotation speed difference and is obtained by the equation (2), to the target converter torque calculating section 430.

At the step 48 following to the negative decision at the step S41, the controller 12 decides whether the slip control flag FLAG is set at 11 or not. When the decision at the step S48 is affirmative (FLAG=11), that is, when the torque converter 2 is put in the lockup range, the routine proceeds to a step S49 wherein the controller 12 sets the torque converter 2 to the lockup state by increasing a gradient indicative of the change of the lockup solenoid drive duty D with respect to a time period. When the decision at the step S48 is negative (FLAG≠11 ), that is, when the torque converter 2 is put in the converter range, the routine proceeds to a step S50 wherein the controller 12 sets the torque converter 2 to the converter state by decreasing the gradient indicative of the change of the lockup solenoid drive duty D with respect to a time period.

Figure 16A:
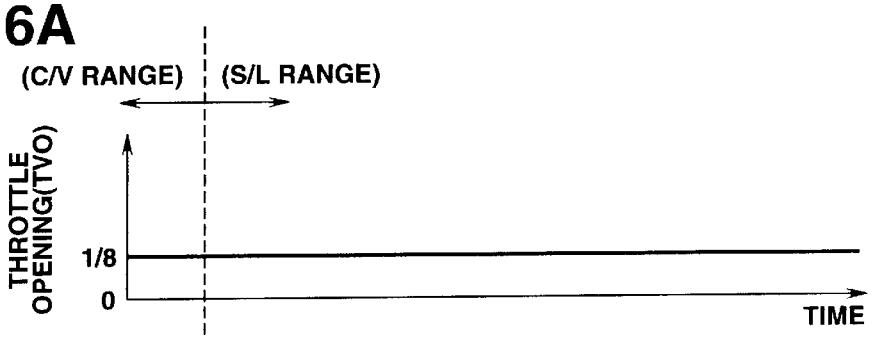
FIGS. 16A to 16E are time charts showing an operation ensured by the slip control according to the present invention.
Figure 16B:
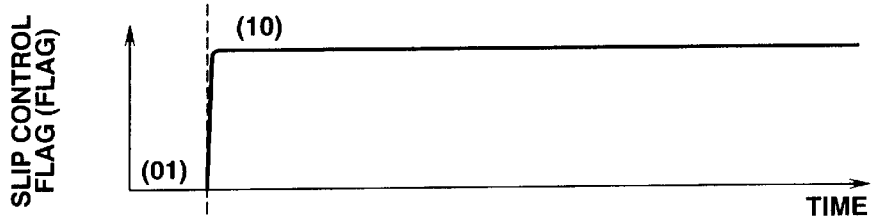
Figure 16C:
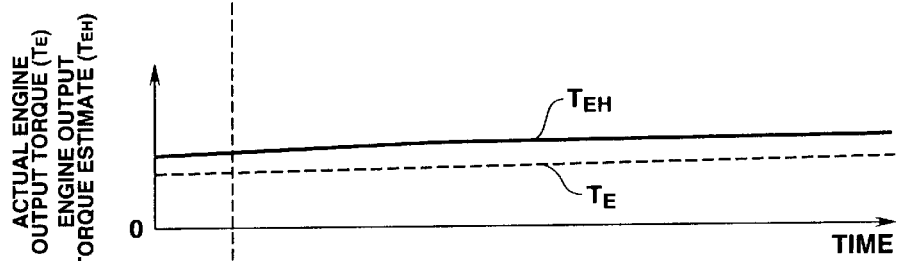
Figure 16D:
Figure 16E:
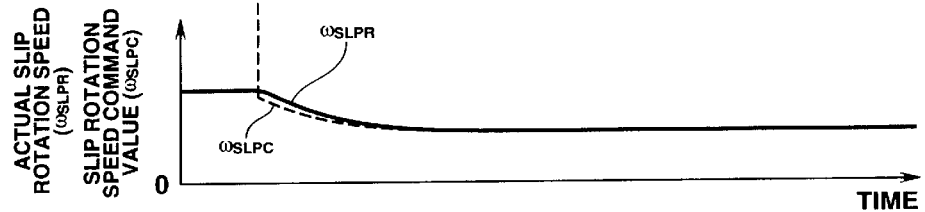

In this embodiment, when the slip control is started from the converter state, the initial value $\omega_{SLPC0}$(C/V) for converter state is employed as the slip rotation speed command value $\omega_{SLPC0}$ (corresponding to the execution of the step S44). This setting compensates the actual slip rotation speed $\omega_{SLPC0}$ so as to be greater than or equal to the allowable lower limit where the engagement shock of the lockup clutch 2 is negligible. Therefore, as is apparent from the simulation result executed on the basis of the slip control maneuver according to the present invention, even when the engine output torque estimate $T_{EH}$ is offset from an actual engine output torque $T_E$ due to errors of modeling the control system or aging deterioration of the engine as shown in FIG. 16C, the actual slip rotation speed $\omega_{SLPR}$ is controlled so as not to become smaller than the allowable lower limit during a transient period of the start of the slip control from the converter state as shown in FIG. 16E, and the engagement shock or engagement vibrations of the lockup clutch 2 during the transient period is certainly avoided by this arrangement. The simulation result shown in FIG. 16E represents timed variations of the actual slip rotation speed $\omega_{SLPC}$ and the slip rotation speed command value $\omega_{SLPC}$. The simulation result was obtained by executing under a condition where the throttle opening TV0 was kept at ⅛ to continue the running of a vehicle as shown in FIG. 16A, and the slip control flag FLAG was changed from 01 to 10 at the moment $t_1$, as shown in FIG. 16B while the engine output torque $T_{EH}$ is offset from the actual engine output torque $T_E$ as shown in FIG. 16D. According to the change of the operating state of the torque converter 2 from the converter state to the slip control state at the moment $t_1$, the lockup clutch engagement pressure ($P_A$-$P_B$) was gradually increased as shown in FIG. 16D.

In this case, if the initial value $\omega_{SLPC0}$(C/V) for converter state is set so that the actual slip rotation speed corresponds to the allowable lower limit of the slip rotation speed, the initial value of the slip rotation speed command value may be set at the necessary minimum value with reference to the above-mentioned operations. This prevents the initial value from becoming too large, and the degradation of the responsibility of the slip control is also prevented.

When the slip control is started from the lockup state, the initial value $\omega_{SLPC0}$(L/U) for the lockup state is employed as the slip rotation speed command value $\omega_{SLPC0}$. The operation corresponds to the execution of the step S45. Therefore, the actual slip rotation speed $\omega_{SLPCR}$ is compensated so as to be zero when the slip control is started from the lockup state. Accordingly, even if the engine output torque estimate $T_{EH}$ is largely offset from the actual engine output torque $T_E$ due to the error of modeling the control system or the aging deterioration of the engine, the torque converter 2 is never set so as to largely generate a slip just after the start of the slip control. This certainly prevents racing of the engine 1 during high load state and undesired running of the vehicle during engine braking period when the slip control is started.

Further, when the initial values $\omega_{SLPC0}(C/V)$ and $\omega_{SLPC0}(L/U)$ of the slip rotation command value are obtained, the electronic control signal (solenoid drive duty D) for controlling the engagement pressure of the lockup clutch 2 at the command value $P_{LUC}$ is determined at one of the first, second and third compensation values. The first compensation value functions to set the actual slip rotation speed at a speed greater than the allowable lower limit. The second compensation value functions to set the actual slip rotation speed at the allowable lower limit. The third compensation value functions to set the actual slip rotation speed at zero. The determined electronic control signal is the solenoid drive duty D, and the initial value of the slip rotation speed command value is obtained on the basis of the determined electronic control signal by means of the inverse calculations in contrast with the procedure for obtaining the electronic control signal D from the slip rotation speed command value. This ensures the following advantages:

That is, since the electronic control signal D is nearest to the controlled object (solenoid 13), it is possible to minimize a margin with respect to the initial values $\omega_{SLPC0}(C/V)$ and $\omega_{SLPC0}(L/U)$. The margin is determined upon taking account of the error between the engine output torque estimate TEH and the actual engine output torque TE. This certainly ensures the above mentioned advantages while maintaining the responsibility of the slip control.

Figure 7B:
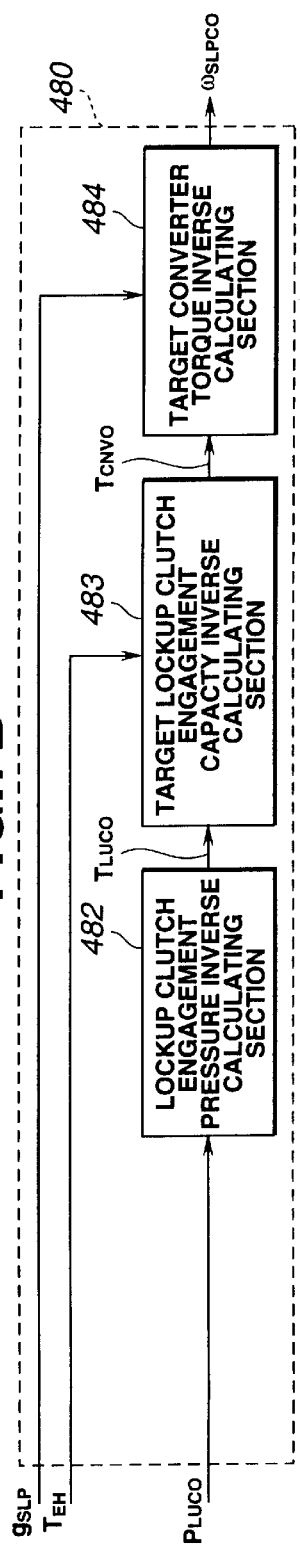
FIGS. 7B and 7C are block diagrams showing other modifications of the slip rotation speed initial command value calculating section of FIG. 5.
Figure 7C:
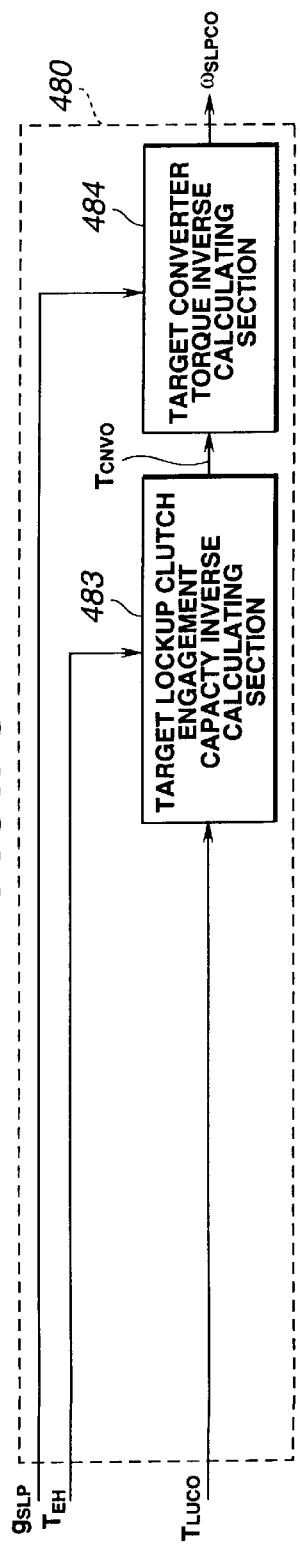

Although the embodiment according to the present invention has been shown and described such that the initial values $\omega_{SLPC0}(C/V)$ and $\omega_{SLPC0}(L/U)$ of the slip rotation speed command value are obtained from the slip rotation speed initial command value calculating section 480 arranged as shown in FIG. 7A, it will be understood that the arrangement of the slip rotation speed initial command value calculating section 480 is not limited to this and may be arranged as shown in FIGS. 7B and 7C.

The slip rotation speed initial command value calculating section 480 of FIG. 7B is constituted by a lockup engagement pressure command value inverse calculating section 482, a target lockup clutch engagement capacity inverse calculating section 483 and a target converter torque inverse calculating section 484 which are the same as those of FIG. 7A. The lockup engagement capacity inverse calculating section 482 is arranged to receive the lockup clutch engagement pressure initial command value $P_{LUC0}$ which is set by the similar manner with that of the lockup solenoid drive duty initial value $D_0$ employed in FIG. 7A. Therefore, by inputting the thus arranged lockup clutch engagement pressure initial command value $P_{LUC0}$ to the slip rotation speed initial command value calculating section 480 of FIG. 7B, the initial values $\omega_{SLPC0}(C/V)$ and $\omega_{SLPC0}(L/U)$ of the slip rotation speed command value are obtained. If the arrangement shown in FIG. 7B is employed, the margin with respect to the initial values $\omega_{SLPC0}(C/V)$ and $\omega_{SLPC0}(L/U)$ of the slip rotation speed command value becomes larger than that of the case of FIG. 7A (since it is apart from the controlled object as compared with the distance of FIG. 7A). However, the increased amount of the margin functions to decrease the load for the calculation of the initial values $\omega_{SLPC0}(C/V)$ and $\omega_{SLPC0}(L/U)$ of the slip rotation speed command value.

The slip rotation speed initial command value calculating section 480 of FIG. 7C is constituted by a target lockup clutch engagement capacity inverse calculating section 483 and a target converter torque inverse calculating section 484 which are the same as those of FIG. 7A. The target lockup clutch engagement capacity inverse calculating section 483 is arranged to receive the lockup clutch engagement capacity initial value $T_{LUC0}$ which is set by the similar manner with that of the lockup solenoid drive duty initial value $D_0$ employed in FIG. 7A. Therefore, by inputting the thus arranged lockup clutch engagement capacity initial value $T_{LUC0}$, the initial values $\omega_{SLPC0}(C/V)$ and $\omega_{SLPC0}(L/U)$ of the slip rotation speed command value are obtained. If the arrangement shown in FIG. 7C is employed, the margin with respect to the initial values $\omega_{SLPC0}(C/V)$ and $\omega_{SLPC0}(L/U)$ of the slip rotation speed command value become larger than that of the case of FIG. 7A since it is apart from the controlled object as compared with the distance of FIG. 7B. However, the increased amount of the margin functions to decrease the load for the calculation of the initial values $\omega_{SLPC0}(C/V)$ and $\omega_{SLPC0}(L/U)$ of the slip rotation speed command value.

With the thus arranged slip control system according to the present invention, when the slip control is started and when the torque converter is put in the converter state, the initial value of the slip rotation speed command value is set at a value by which the actual slip rotation speed becomes greater than a lower limit of a range wherein shocks caused by engaging the lockup clutch is negligible. Therefore, even if an error between an actual torque and an estimated torque for the slip control is generated, the actual slip rotation speed $\omega_{SLPR}$ is controlled so as not to become smaller than the allowable lower limit during a transient period of the start of the slip control from the converter state, and the engagement shock or engagement vibrations of the lockup clutch 2 during the transient period is certainly avoided by this arrangement.

The entire contents of Japanese Patent Application No. 10-315776 filed on Nov. 6, 1998 in Japan are incorporated herein by reference.

Although the invention has been described above by reference to a certain embodiment of the invention, the invention is not limited to the embodiment described above. Modifications and variations of the embodiment described above will occur to those skilled in the art, in light of the above teaching.

What is claimed is:

1. A slip control system for a torque converter with a lockup clutch, the slip control system controlling an actual slip rotation speed between input and output elements of the torque converter at a target slip rotation speed, the torque converter being connected to an engine and a transmission of a vehicle, the slip control system comprising:

a vehicle operating condition detector detecting operating condition of the vehicle;

an actuator controlling a lockup clutch engagement pressure of the lockup clutch according to a control signal to adjust the actual slip rotation speed at the target slip rotation speed; and a controller connected to said vehicle operating condition detector and said actuator, said controller being arranged to decide an operating state of the torque converter when the slip control is started, to decide an initial value of a slip rotation speed command value according to the operating state of the torque converter at the start of the slip control, to calculate the slip rotation speed command value on the basis of the detected vehicle operating condition, and to output the control signal corresponding to the slip rotation speed command value to said actuator;

wherein the control signal is selected from a first value by which the actual slip rotation speed becomes greater than or equal to a limit of a range wherein shocks caused by engaging the lockup clutch is negligible, and a second value by which the actual slip rotation speed becomes zero, the initial value of the slip rotation speed command value being obtained by executing inverse calculation steps of the calculation steps on the basis of the determined control signal.

2. A slip control system as claimed in claim 1, wherein when the slip control is started at a converter state where the actual slip rotation speed is not limited by the lockup clutch, the initial value of the slip rotation speed command value is set at a value by which the actual slip rotation speed becomes greater than a lower limit of a range wherein shocks caused by engaging the lockup clutch is negligible.

3. A slip control system as claimed in claim 1, wherein when the slip control is started at a converter state where the actual slip rotation speed is not limited by the lockup clutch, the initial value of the slip rotation speed command value is set at a value by which the actual slip rotation speed becomes equal to a lower limit of a range wherein shocks caused by engaging the lockup clutch is negligible.

4. A slip control system as claimed in claim 1, wherein when the slip control is started at a lockup state where the actual slip rotation speed is kept at zero, the initial value of the slip rotation speed command value is set at a value by which the actual slip rotation speed becomes zero.

5. A slip control system as claimed in claim 1, wherein said vehicle operating condition detector includes a throttle opening sensor, a converter input element rotation speed sensor, a converter output element rotation speed sensor, a converter oil temperature sensor, a transmission output rotation speed sensor, and a transmission ratio calculating section.

6. A slip control system for a torque converter with a lockup clutch, the slip control system controlling an actual slip rotation speed between input and output elements of the torque converter at a target slip rotation speed, the torque converter being connected to an engine and a transmission of a vehicle, the slip control system comprising:
   a vehicle operating condition detector detecting operating condition of the vehicle;
   an actuator controlling a lockup clutch engagement pressure of the lockup clutch according to a control signal to adjust the actual slip rotation speed at the target slip rotation speed; and
   a controller connected to said vehicle operating condition detector and said actuator, said controller being arranged to decide an operating state of the torque converter when the slip control is started, to decide an initial value of a slip rotation speed command value according to the operating state of the torque converter at the start of the slip control, to calculate the slip rotation speed command value on the basis of the detected vehicle operating condition, and to output the control signal corresponding to the slip rotation speed command value to said actuator;
   wherein a command value of the lockup engagement pressure is selected from a first value by which the actual slip rotation speed becomes greater than a lower limit of a range wherein shocks caused by engaging the lockup clutch is negligible, and a second value by which the actual slip rotation speed becomes zero, the initial value of the slip rotation speed command value being obtained by executing inverse calculation steps of the calculation steps on the basis of the determined lockup engagement pressure command value.

7. A slip control system for a torque converter with a lockup clutch, the slip control system controlling an actual slip rotation speed between input and output elements of the torque converter at a target slip rotation speed, the torque converter beings connected to an engine and a transmission of a vehicle, the slip control system comprising:
   a vehicle operating condition detector detecting operating condition of the vehicle;
   an actuator controlling a lockup clutch engagement pressure of the lockup clutch according to a control signal to adjust the actual slip rotation speed at the target slip rotation speed; and
   a controller connected to said vehicle operating condition detector and said actuator, said controller being arranged to decide an operating state of the torque converter when the slip control is started, to decide an initial value of a slip rotation speed command value according to the operating state of the torque converter at the start of the slip control, to calculate the slip rotation speed command value on the basis of the detected vehicle operating condition, and to output the control signal corresponding to the slip rotation speed command value to said actuator;
   wherein a target value of a lockup clutch engagement capacity is selected from a first value by which the actual slip rotation speed becomes greater than or equal to a lower limit of a range wherein shocks caused by engaging the lockup clutch is negligible, and a second value by which the actual slip rotation speed be comes zero, the initial value of the slip rotation speed command value being obtained by executing inverse calculation steps of the calculation steps on the basis of the determined target value of the lockup clutch engagement capacity.

8. A slip control system for a torque converter with a lockup clutch, the slip control system controlling an actual slip rotation speed between input and output elements of the torque converter at a target slip rotation speed, the torque converter being connected to an engine and a transmission of a vehicle, the slip control system comprising:
   a vehicle operating condition detector detecting operating condition of the vehicle;
   an actuator controlling a lockup clutch engagement pressure of the lockup clutch according to a control signal to adjust the actual slip rotation speed at the target slip rotation speed; and
   a controller connected to said vehicle operating condition detector and said actuator, said controller being arranged to decide an operating state of the torque converter when the slip control is started, to decide an initial value of a slip rotation speed command value according to the operating state of the torque converter at the start of the slip control, to calculate the slip rotation speed command value on the basis of the detected vehicle operating condition, to obtain the control signal by executing calculating steps on the basis of the slip rotation speed command value, the vehicle operating condition and maps indicative of characteristics of the torque converter and the engine, and to output the control signal to said actuator;
   wherein the control signal is selected from a first value by which the actual slip rotation speed becomes greater than a lower limit of a range wherein shocks caused by engaging the lockup clutch is negligible, and a second value by which the actual slip rotation speed becomes zero, the initial value of the slip rotation speed command value being obtained by executing inverse calculation steps of the calculation steps on the basis of the determined control signal.

9. A slip control system for a torque converter with a lockup clutch, the slip control system controlling an actual slip rotation speed between input and output elements of the torque converter at a target slip rotation speed, the torque converter being connected to an engine and a transmission of a vehicle, the slip control system comprising:

a vehicle operating condition detector detecting operating condition of the vehicle;

an actuator controlling a lockup clutch engagement pressure of the lockup clutch according to a control signal to adjust the actual slip rotation speed at the target slip rotation speed; and a controller connected to said vehicle operating condition detector and said actuator, said controller being arranged to decide an operating state of the torque converter when the slip control is started, to decide an initial value of a slip rotation speed command value according to the operating state of the torque converter at the start of the slip control, to calculate the slip rotation speed command value on the basis of the detected vehicle operating condition, to obtain the control signal by executing calculating steps on the basis of the slip rotation speed command value, the vehicle operating condition and maps indicative of characteristics of the torque converter and the engine, and to output the control signal to said actuator;

wherein a command value of the lockup engagement pressure is selected from a first value by which the actual slip rotation speed becomes greater than a lower limit of a range wherein shocks caused by engaging the lockup clutch is negligible, and a second value by which the actual slip rotation speed becomes zero, the initial value of the slip rotation speed command value being obtained by executing inverse calculation steps of the calculation steps on the basis of the determined lockup engagement pressure command value.

10. A slip control system for a torque converter with a lockup clutch, the slip control system controlling an actual slip rotation speed between input and output elements of the torque converter at a target slip rotation speed, the torque converter being connected to an engine and a transmission of a vehicle, the slip control system comprising:

a vehicle operating condition detector detecting operating condition of the vehicle;

an actuator controlling a lockup clutch engagement pressure of the lockup clutch according to a control signal to adjust the actual slip rotation speed at the target slip rotation speed; and a controller connected to said vehicle operating condition detector and said actuator, said controller being arranged to decide an operating state of the torque converter when the slip control is started, to decide an initial value of a slip rotation speed command value according to the operating state of the torque converter at the start of the slip control, to calculate the slip rotation speed command value on the basis of the detected vehicle operating condition, to obtain the control signal by executing calculating steps on the basis of the slip rotation speed command value, the vehicle operating condition and maps indicative of characteristics of the torque converter and the engine, and to output the control signal to said actuator;

wherein a target value of a lockup clutch engagement capacity is selected from a first value by which the actual slip rotation speed becomes greater than or equal to a lower limit of a range wherein shocks caused by engaging the lockup clutch is negligible, and a second value by which the actual slip rotation speed becomes zero, the initial value of the slip rotation speed command value being obtained by executing inverse calculation steps of the calculation steps on the basis of the determined target value of the lockup clutch engagement capacity.

* * * * *